United States Patent
Bank et al.

(10) Patent No.: US 6,239,217 B1
(45) Date of Patent: May 29, 2001

(54) MOLDING COMPOSITION CONTAINING SYNDIOTACTIC VINYLAROMATIC POLYMER

(75) Inventors: David H. Bank; John M. Warakomski, both of Midland, MI (US); Shaofu Wu, Missouri City; Kalyan Sehanobish, Friendwood, both of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/400,567

(22) Filed: Sep. 21, 1999

Related U.S. Application Data

(63) Continuation of application No. 08/904,374, filed on Aug. 1, 1997, now abandoned, which is a continuation of application No. 08/611,292, filed on Mar. 5, 1996, now abandoned.
(60) Provisional application No. 60/012,882, filed on Mar. 5, 1996.

(51) Int. Cl.⁷ .............................. C08L 53/00; C08L 53/02
(52) U.S. Cl. ................................ 525/89; 525/98; 525/99; 524/505
(58) Field of Search .................................. 525/98, 99, 89; 524/505

(56) References Cited

U.S. PATENT DOCUMENTS

| | | |
|---|---|---|
| 5,250,618 | 10/1993 | Faluso et al. . |
| 5,278,232 | 1/1994 | Seelert et al. . |
| 5,334,657 | 8/1994 | Swatzmiller et al. . |
| 5,344,869 | 9/1994 | Seelter et al. . |
| 5,391,603 | 2/1995 | Wessel et al. . |
| 5,391,611 | 2/1995 | Funayanna et al. . |
| 5,395,890 | 3/1995 | Nakano et al. . |
| 5,460,818 | 10/1995 | Park et al. . |
| 5,532,315 | 7/1996 | Bonekamp et al. . |
| 6,005,050 | * 12/1999 | Okada et al. ........................ 525/68 |

FOREIGN PATENT DOCUMENTS

WO 96/11233   4/1996  (WO) .

* cited by examiner

Primary Examiner—Jeffrey Mullis

(57) ABSTRACT

A composition of matter comprising:
A) from 25 to 90 parts by weight of a syndiotactic, vinylaromatic polymer,
B) from 5 to 30 parts by weight of an oil extended, elastomeric polyolefin;
C) from 1 to 10 parts by weight of a compatibilizer comprising a styrene containing block copolymer or a hydrogenated derivative thereof;
D) from 0 to 25 parts by weight of a domain forming rubbery polymer comprising a styrene/conjugated diene triblock copolymer or a hydrogenated derivative thereof;
E) from 0 to 5 parts by weight of a nucleator for the syndiotactic, vinylaromatic thermoplastic resin,
F) from 0 to 60 parts by weight of a reinforcing agent, and
G) from 0 to 90 parts by weight of a polyarylene ether or polar group modified polyarylene ether.

9 Claims, No Drawings

MOLDING COMPOSITION CONTAINING SYNDIOTACTIC VINYLAROMATIC POLYMER

CROSS REFERENCE STATEMENT

This is a continuation of Ser. No. 08/904,374, filed Aug. 1, 1997, which is a continuation of Ser. No. 08/611,292, filed Mar. 5, 1996, now abandoned, which claims the benefit of U.S. Provisional Serial No. 60/012,882, filed Mar. 5, 1996.

BACKGROUND

The present invention relates to syndiotactic vinylaromatic polymer compositions containing impact modifiers. More particularly the present invention relates to such compositions wherein the impact modifier comprises an oil extended elastomeric polyolefin. The compositions may further be modified to incorporate crystal modifiers, compatibilizers, fillers, and optionally reinforcing aids. Surprisingly, according to the present invention, high temperature resistant syndiotactic vinylaromatic polymer compositions can be produced having improved elongation, rigidity and toughness.

SUMMARY OF THE INVENTION

According to the present invention there is provided a composition of matter comprising (based on total composition weight:
A) from 25 to 90 parts by weight of a syndiotactic, vinylaromatic polymer,
B) from 5 to 30 parts by weight of an oil extended, elastomeric polyolefin;
C) from 1 to 10 parts by weight of a compatibilizer comprising a styrene containing block copolymer or a hydrogenated derivative thereof;
D) from 0 to 25 parts by weight of a domain forming rubbery polymer comprising a triblock copolymer of styrene and a conjugated diene or a hydrogenated derivative thereof;
E) from 0 to 5 parts by weight of a nucleator for the syndiotactic, vinylaromatic thermoplastic resin,
F) from 0 to 60 parts by weight of a reinforcing agent, and
G) from 0 to 90 parts by weight of a polyarylene ether or polar group modified polyarylene ether.

The polymeric blend has been found to possess increased elongation properties, especially ultimate elongation or elongation at rupture (Er). In addition, in glass filled compositions, the use temperature is also improved, as measured for example by distortion temperature under load (DTUL). Advantageously, while demonstrating improvement in ultimate elongation and DTUL, the resins of the present invention retain advantageous impact properties and tensile strength properties of resin blends not containing the oil extended elastomeric polyolefin resin.

DETAILED DESCRIPTION OF THE INVENTION

Syndiotactic vinylaromatic polymers especially include syndiotactic polystyrene prepared by coordination polymerization of styrene monomer under conditions to provide a high degree of syndiotacticity. Most highly preferred are those polymers containing greater than 75 percent syndiotacticity at a racemic triad, preferably greater than 95 percent syndiotacticity at a racemic triad. Such polymers are known in the art having been previously disclosed in, for example, U.S. Pat. No. 4,680,353; U.S. Pat. No. 4,959,435; U.S. Pat. No. 4,950,724; and U.S. Pat. No. 4,774,301. Preferred compositions according to the invention comprise from 50 to 90 parts by weight syndiotactic vinylaromatic polymer.

Elastomeric polyolefins include any polymer comprising one or more $C_{2-20}$ α-olefins in polymerized form, having Tg less than 25° C., preferably less than 0° C. Examples of the types of polymers from which the present elastomeric polyolefins are selected include homopolymers and copolymers of α-olefins, such as ethylene/propylene, ethylene/1-butene, ethylene/1-hexene or ethylene/1-octene copolymers, and terpolymers of ethylene, propylene and a comonomer such as hexadiene or ethylidenenorbornene. Grafted derivatives of the foregoing rubbery polymers such as polystyrene-, maleic anhydride-, polymethylmethacrylate- or styrene/methyl methacrylate copolymer-grafted elastomeric polyolefins may also be used.

The elastomeric polyolefins are softened by incorporation of an aliphatic oil to extend the polyolefin phase, making it softer and more readily dispersed into the syndiotactic vinyl aromatic polymer phase. The extending oils, also referred to as paraffinic/naphthenic oils, are usually fractions of refined petroleum products having less than about 30 percent by weight of aromatics (by clay-gel analysis) and having viscosities between about 100 and 500 SSU at 100° F. (38° C.). Commercial extending oils include SHELLFLEX® oils, numbers 310, 371 and 311 (which is a blend of 310 and 371), available from Shell Oil Company or Drakeol™, numbers 34 or 35, available from Penreco division of Pennzoil Products Company. The amount of extending oil employed varies from 0.01 to 35.0 percent by weight of the elastomeric polyolefin, preferably from 0.1–25 percent.

Preferred elastomeric polyolefins for use herein are such polymers that are characterized by a narrow molecular weight distribution and a uniform branching distribution. Preferred elastomeric polyolefins are linear or substantially linear ethylene interpolymers having a density from 0.85 to 0.93 $g/cm^3$, a melt index from 0.1 to 5 g/10 min, and a polydispersity of from 1.8 to 5. Such polymers are preferably those prepared using a Group 4 metal constrained geometry complex by means of a continuous solution polymerization process, such as are disclosed in U.S. Pat. Nos. 5,272,236 and 5,278,272, the teachings of which are hereby incorporated by reference.

Preferred elastomeric polyolefins have a density of from 0.860 to 0.920 $g/cm^3$, more preferably from 0.865 to 0.915 $g/cm^3$, and especially less than or equal to 0.910 $g/cm^3$. Advantageously, component (B) has a melt index from 0.2 to 3 g/10 min. This provides good processing characteristics, gloss, impact resistance, and environmental stress cracking resistance. At polydispersity values exceeding 5, the mechanical properties and gloss of the molded articles decreases. Preferably, component (B) has a polydispersity of 1.8 to 4, more preferably from 1.8 to 2.5.

All references herein to elements or metals belonging to a certain Group refer to the Periodic Table of the Elements published and copyrighted by CRC Press, Inc., 1989. Also, any reference to the Group or Groups shall be to the Group or Groups as reflected in this Periodic Table of the Elements using the IUPAC system for numbering Groups.

The term "polymer" as used herein refers to a polymeric compound prepared by polymerizing one or more monomers. The generic term polymer thus embraces the term homopolymer, usually employed to refer to polymers prepared from only one monomer, and the term interpolymer as defined hereinafter.

The term "interpolymer" as used herein refers to polymers prepared by the polymerization of at least two different monomers. The generic term interpolymer thus embraces copolymers, usually employed to refer to polymers prepared from two different monomers, and polymers prepared from more than two different monomers.

While describing in the present invention a polymer or interpolymer as comprising or containing certain monomers, it is meant that such polymer or interpolymer comprises or contains polymerized therein units derived from such a monomer. For example, if the monomer is ethylene $CH_2=CH_2$, the derivative of this unit as incorporated in the polymer is —$CH_2$—$CH_2$—.

Where melt index values are specified in the present application without giving measurement conditions, the melt index as defined in ASTM D-1238, Condition 190° C./2.16 kg (formerly known as "Condition (E)" and also known as I2) is meant. Melt index is inversely proportional to the molecular weight of the polymer. Thus, the higher the molecular weight, the lower the melt index, although the relationship is not linear.

The term "substantially linear" ethylene polymer or interpolymer as used herein means that, in addition to the short chain branches attributable to intentionally added α-olefin comonomer incorporation in interpolymers, the polymer backbone is substituted with an average of 0.01 to 3 long chain branches/1000 carbons, more preferably from 0.01 long chain branches/1000 carbons to 1 long chain branches/1000 carbons, and especially from 0.05 long chain branches/1000 carbons to 1 long chain branches/1000 carbons.

Long chain branching is defined herein as a chain length of at least 1 carbon less than the number of carbons in the longest intentionally added α-olefin comonomer, whereas short chain branching is defined herein as a chain length of the same number of carbons in the branch formed from any intentionally added α-olefin comonomer after it is incorporated into the polymer molecule backbone. For example, an ethylene/1-octene substantially linear polymer has backbones substituted with long chain branches of at least 7 carbons in length, but it also has short chain branches of only 6 carbons in length resulting from polymerization of 1-octene.

The presence and extent of long chain branching in ethylene interpolymers is determined by gel permeation chromatography coupled with a low angle laser light scattering detector (GPC-LALLS) or by gel permeation chromatography coupled with a differential viscometer detector (GPC-DV). The use of these techniques for long chain branch detection and the underlying theories have been well documented in the literature, for example in Zimm, G. H. and Stockmayer, W. H., *J. Chem. Phys.,* Vol. 17, p. 1301 (1949) and Rudin, A., *Modern Methods of Polymer Characterization,* John Wiley & Sons, New York (1991), pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., U.S.A., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/1-octene copolymers.

deGroot and Chum also showed that a plot of Log(I2, Melt Index) as a function of Log(GPC, Weight Average Molecular Weight) as determined by GPC-DV illustrates that the long chain branching aspects (but not the branching extent) of substantially linear ethylene polymers are comparable to that of high pressure, highly branched low density polyethylene (LDPE) and are clearly distinct from ethylene polymers produced using Ziegler-type catalysts such as hafnium and vanadium complexes.

The empirical effect of the presence of long chain branching in the substantially linear ethylene/α-olefin interpolymers used in the invention is manifested as enhanced Theological properties which are quantified and expressed herein in terms of gas extrusion rheometry (GER) results, and/or in terms of melt flow ratio (I10/I2) increase.

In contrast to the term "substantially linear", the term "linear" means that the polymer lacks measurable or demonstrable long chain branches, i.e., the polymer is substituted with an average of less than 0.01 long branches/1000 carbons.

Substantially linear ethylene interpolymers as used herein are further characterized as having (a) a melt flow ratio, $I10/I2 \geq 5.63$, (b) a molecular weight distribution or polydispersity, Mw/Mn, as determined by gel permeation chromatography and defined by the equation:

$$(Mw/Mn)=(I10/I2)-4.63,$$

(c) a critical shear stress at the onset of gross melt fracture, as determined by gas extrusion rheometry, of greater than $4\times10^6$ dynes/cm$^3$, or a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an I2, Mw/Mn and density within 10 percent of the substantially linear ethylene polymer and wherein the respective critical shear rates of the substantially linear ethylene polymer and the linear ethylene polymer are measured at the same melt temperature using a gas extrusion rheometer, and (d) a single differential scanning calorimetry, DSC, melting peak between −30° C. and 150° C.

Determination of the critical shear rate and the critical shear stress in regards to melt fracture as well as other rheology properties such as the "rheological processing index" (PI) is performed using a gas extrusion rheometer (GER). The gas extrusion rheometer is described by M. Shida, R. N. Shroff and L. V. Cancio in *Polymer Engineering Science,* Vol. 17, No. 11, p. 770 (1977), and in *Rheometers for Molten Plastics,* by John Dealy, published by Van Nostrand Reinhold Co. (1982) on pp. 97–99. The processing index is measured at a temperature of 190° C., at nitrogen pressure of 2500 psig (17 Mpa) using a 0.0296 inch (0.0117 cm) diameter, 20:1 L/D die with an entrance angle of 180°. The GER processing index is calculated in millipoise units from the following equation:

$$PI=2.15\times10^6 \text{ dynes/cm}^2/(1000\times\text{shear rate}),$$

where: $2.15\times10^6$ dynes/cm$^2$ is the shear stress at 2500 psi, (17 Mpa) and the shear rate is the shear rate at the wall represented by the following equation:

$$32Q'/(60 \text{ sec/min})(0.745)(\text{diameter}\times2.54 \text{ cm/in})^3,$$

where Q' is the extrusion rate (g/min), 0.745 is the melt density of the polyethylene (g/cm$^3$), and diameter is the orifice diameter of the capillary (inches).

The PI is the apparent viscosity of a material measured at apparent shear stress of $2.15\times10^6$ dyne/cm$^2$.

For the substantially linear ethylene polymers described herein, the PI is less than or equal to 70 percent of that of a comparative linear olefin polymer having an I2 and Mw/Mn each within 10 percent of the substantially linear ethylene polymers.

The rheological behavior of substantially linear ethylene polymers can also be characterized by the Dow Rheology Index (DRI), which expresses a polymer's "normalized relaxation time as the result of long chain branching." (See, S. Lai and G. W. Knight "ANTEC '93 Proceedings, INSITE™ Technology Polyolefins (ITP)—New Rules in the Structure/Rheology Relationship of Ethylene/α-Olefin Copolymers," New Orleans, La., U.S.A., May 1993.) DRI values range from 0, for polymers which do not have any measurable long chain branching (for example, TAFMER™ products available from Mitsui Petrochemical Industries and EXACT™ products available from Exxon Chemical Company), to 15 and is independent of melt index. In general, for low- to medium-pressure ethylene polymers (particularly at lower densities), DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from the equation:

$$DRI=3652879\times\tau^{\circ 1.00649}/(\eta^\circ-1)/10$$

where $\tau^\circ$ is the characteristic relaxation time of the material and $\eta^\circ$ is the zero shear viscosity of the material. Both $\tau^\circ$ and are the "best fit" values to the Cross equation, that is, $$\eta/\eta^\circ=1/(1+(\gamma\cdot\tau^\circ)^n)$$

where n is the power law index of the material, and $\eta$ and $\gamma$ are the measured viscosity and shear rate (rad sec$^{-1}$), respectively. Baseline determination of viscosity and shear rate data are obtained using a Rheometric Mechanical Spectrometer (RMS-800) under dynamic sweep mode from 0.1 to 100 rad/sec at 190° C. and a Gas Extrusion Rheometer (GER) at extrusion pressures from 1000 psi to 5000 psi (6.89 to 34.5 MPa), which corresponds to shear stress from 0.086 to 0.43 MPa, using a 0.0754 mm diameter, 20:1 L/D die at 190° C. Specific material determinations can be performed from 140° C. to 190° C. as required to accommodate melt index variations.

An apparent shear stress versus apparent shear rate plot is used to identify the melt fracture phenomena. According to Ramamurthy in *Journal of Rheology*, Vol. 30(2), pp. 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin." In this disclosure, the onset of surface melt fracture (OSMF) is characterized as the beginning of losing extrudate gloss at which the surface roughness of extrudate can only be detected by 40×magnification. The critical shear rate at onset of surface melt fracture for the substantially linear ethylene polymers is at least 50 percent greater than the critical shear rate at the onset of surface melt fracture of a linear ethylene polymer having about the same I2 and Mw/Mn.

Gross melt fracture occurs at unsteady flow conditions and ranges in detail from regular (alternating rough and smooth or helical) to random distortions. The critical shear rate at onset of surface melt fracture (OSMF) and onset of gross melt fracture (OGMF) will be used herein based on the changes of surface roughness and configurations of the extrudates extruded by a GER.

The substantially linear ethylene polymers used in the invention are also characterized by a single DSC melting peak. The single melting peak is determined using a differential scanning calorimeter standardized with indium and deionized water. The method involves 5 to 7 mg sample sizes, a "first heat" to 150° C. which is held for 4 minutes, a cool down at 10° C./minute to −30° C. which is held for 3 minutes, and heated at 10° C./minute to 150° C. for the "second heat." The single melting peak is taken from the "second heat" heat flow versus temperature curve. Total heat of fusion of the polymer is calculated from the area under the curve.

For polymers having a density of 0.875 g/cm$^3$ to 0.910 g/cm$^3$, the single melting peak may show, depending on equipment sensitivity, a "shoulder" or a "hump" on the low melting side that constitutes less than 12 percent, typically less than 9 percent, and more typically less than 6 percent, of the total heat of fusion of the polymer. Such an artifact is observable for other homogeneously branched polymers such as EXACT™ resins (made by Exxon Chemical Company) and is discerned on the basis of the slope of the single peak varying monotonically through the melting region of the artifact. Such an artifact occurs within 34° C., typically within 27° C., and more typically within 20° C., of the melting point of the single peak. The heat of fusion attributable to an artifact can be separately determined by specific integration of its associated area under the heat flow versus temperature curve.

The term "polydispersity" as used herein is a synonym for the term "molecular weight distribution" which is determined as follows:

The polymer or composition samples are analyzed by gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polymer molecular weights are determined by using appropriate Mark-Houwink coefficients for polyethylene and polystyrene (as described by Williams and Word in *Journal of Polymer Science, Polymer Letters*, Vol. 6, p. 621 (1968), to derive the following equation:

$$M_{polyethylene} = 0.4316 \, (M_{polystyrene}).$$

Weight average molecular weight, Mw, is calculated in the usual manner according to the following formula:

$$Mw = \Sigma i \; wi \cdot Mi,$$

where wi and Mi are the weight fraction and molecular weight, respectively, of the ith fraction eluting from the GPC column.

In addition to the elastomeric polyolefin component, the resin blend of the invention may comprise one or more domain forming rubbery polymers. Such additional rubbery polymers are suitably chosen in order to impart impact absorbing properties to the polymer composition. It is believed, without wishing to be bound by such belief, that under the extreme temperatures required for compounding syndiotactic vinylaromatic polymers, most conventional rubbery polymers lose their structural integrity and do not form impact absorbing domains. Rather, the rubbery polymer becomes extended and drawn by the compounding forces into thin sections that are incapable of absorbing impact forces. This result is due to several factors including the viscosity properties of the rubbery polymer and the matrix polymer (that is, the syndiotactic vinylaromatic polymer) under the compounding conditions employed, the interfacial tension existing between the rubber phase and the matrix, and the extent of relaxation afforded the polymer melt. The first two factors are determined by the physical and chemical properties of the block copolymer and the matrix, whereas the latter factor is controllable by the conditions utilized in the compounding or molding operation. By incorporating a soft phase comprising the elastomeric polyolefin into which the domain forming rubbery polymer may partition, the shearing forces experienced by the domain forming rubbery polymer during extrusion or melt compounding are greatly reduced and the desired impact absorbing, domain forming morphology of the resin is more readily preserved.

Generally, it is desirable to provide a domain forming rubbery polymer having extremely high melt viscosity, that is, very low melt flow. Such polymers having high melt viscosity are not drawn into extremely thin sections by the shear forces of the compounding process, and retain greater ability to reform discrete rubber particles more closely resembling spherical particles upon discontinuance of shearing forces. Additionally, the triblock copolymer beneficially should retain sufficient elastic memory to reform droplets in the melt when shearing forces are absent. One beneficial result of the present combination appears to be that the triblock copolymer is selected to be compatible with the elastomeric polyolefin into which it mostly partitions under processing condition. Within such domain, the shearing forces are not as detrimental to rubber domain formation as when the block copolymer is incorporated directly into the matrix resin. Most preferred triblock copolymers are those having a melt flow rate, Condition X (315° C., 5.0 Kg) from 0 to 0.5 g/10 min.

A second desirable characteristic of the domain forming rubbery polymer is to provide compatibility between the matrix polymer and the elastic polyolefin so as to develop maximum interfacial tension between the molten phases consistent with the need for satisfactory adhesion between the solid phases to promote impact absorption. Increased interfacial tension in the melt promotes rubber droplet formation due to the driving force to reduce surface area of the rubber particles in contact with the matrix. This increased interfacial tension in the melt does not necessarily result in incompatible, solid polymer phases that reduce impact strength in the molded part, if such a compatibilizing polymer is present.

The operating conditions are preferably chosen to provide sufficient relaxation time in the melt so that the aforementioned rubber particle formation can occur. If the molten polymer, containing undesirable thin strata of the impact modifier due to shearing forces, is quenched relatively quickly from the melt, the necessary droplet formation cannot occur and the resulting molded part will be deficient in impact properties. This result can occur, for example, in a molding process using molds operating at too low a mold temperature.

Generally, higher molecular weight domain forming rubbery block copolymers possess increased melt viscosity. Accordingly, preferred domain forming rubbery block copolymers are those having Mw from 100,000 to 400,000 Daltons, more preferable from 150,000 to 300,000 Daltons, and having Tg less than 25° C., more preferably less than 0° C. Weight average molecular weights recited herein are apparent values based on a polystyrene standard, derived from gel permeation chromatography data, and not corrected for hydrodynamic volume differences between polystyrene and other polymeric components. Low molecular weight block copolymers, that is, polymers having molecular weight less than 100,000 Daltons, have been found to possess insufficient melt viscosity to achieve the desired rubber droplet formation. Preferred quantities of the domain forming rubbery polymer are from 2 to 30, most preferably 5 to 25 parts by weight. Also, hydrogenated styrene/butadiene/styrene triblock copolymers generally possess reduced melt flow rate compared to unhydrogenated polymers of the same molecular weight. Accordingly, hydrogenated styrene/butadiene/styrene triblock copolymers are most preferred rubbery block copolymers for use in the present invented blend.

Where a rubbery block copolymer is not included in the composition, and optionally when it is included, it is further desirable to additionally include a compatibilizing block copolymer comprising a lower molecular weight (higher melt index) styrene/butadiene/styrene triblock copolymer, a hydrogenated styrene/butadiene/styrene triblock copolymer, or a styrene/butadiene diblock copolymer, a styrene/isoprene diblock copolymer, or a hydrogenated derivative thereof. Preferred diblock copolymers are those containing from 45 to 75 weight percent styrene with the remainder comprising butadiene, isoprene or a hydrogenated derivative thereof.

It is believed without wishing to be bound by such belief that the domain forming rubbery polymer may under certain conditions form a hard phase within the dispersed soft phase comprising the elastomeric polyolefin resin. In addition to the use of such domain forming rubbery polymers in this application a small quantity of a low density polyethylene may also be utilized to further extend the elastomeric polyolefin soft phase. Suitable low density polyethylene polymers include linear interpolymers of ethylene and at least one further α-olefin, most preferred are homogeneous linear interpolymers. Preferred α-olefins have from 3 to 20 carbon atoms. More preferred α-olefins have from 3 to 8 carbon atoms. Exemplary comonomers include propene, 1-butene, 1-pentene, 4-methyl-1-pentene, 1-hexene, and 1-octene. The low density polyethylene may also contain, in addition to the α-olefin, one or more further comonomers, such as diolefins, ethylenically unsaturated carboxylic acids (both mono- and difunctional) as well as derivatives of these acids, such as esters and anhydrides. Exemplary of such additional comonomers are acrylic acid, methacrylic acid, vinyl acetate and maleic anhydride. The low density polymers suitable for use in the present compositions can be further characterized by their homogeneity and degree of long chain branching.

Homogeneous linear interpolymers for use herein are defined as in U.S. Pat. No. 3,645,992 (Elston). Accordingly, homogeneous interpolymers are those in which the comonomer is randomly distributed within a given interpolymer molecule and wherein the interpolymer molecules have a distribution of ethylene/comonomer ratios which is narrow. In contrast, heterogeneous interpolymers are those in which the ethylene/comonomer ratio distribution of such polymer is rather broad.

The term "narrow composition distribution" used herein describes the comonomer distribution for homogeneous interpolymers. Homogeneous interpolymers generally are characterized by having only a single melting peak and essentially lack a measurable "linear" polymer fraction. The narrow composition distribution homogeneous interpolymers can also be characterized by their SCBDI (Short Chain Branch Distribution Index) or CDBI (Composition Distribution Branch Index). The SCBDI or CDBI is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild, et al., *Journal of Polymer Science, Poly. Phys. Ed.*, Vol. 20, p. 441 (1982), or in U.S. Pat. No. 4,798,081. The SCBDI or CDBI for narrow composition distribution homogeneous interpolymers are generally greater than about 30 percent, preferably greater than about 50 percent, especially greater than about 90 percent. The narrow composition distribution homogeneous interpolymers and copolymers used in this invention essentially lack a measurable "high density" (that is, "linear" or "homopolymer") fraction as measured by the TREF technique. The homogeneous interpolymers have a degree of branching less than or equal to 2 methyls/1000 carbons in about 15 percent (by weight) or less, preferably less than about 10 percent (by weight), and especially less than about 5 percent (by weight). The term "broad composition distribution" used herein describes the comonomer distribution for heterogeneous interpolymers and means that the heterogeneous interpolymers have a "linear" fraction and multiple melting peaks (that is, such polymers exhibit at least two distinct melting peaks when measured by DSC). The heterogeneous interpolymers and polymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight).

A first subclass of the linear olefin polymers is that of the traditional heterogeneous, linear, low density ethylene interpolymers (LLDPE) made using Ziegler catalysts in a slurry, gas phase, solution or high pressure process (for example, those interpolymers prepared according to U.S. Pat. No. 4,076,698). In the art, often a distinction is made between LLDPE and very low density (VLDPE) or ultra low density polymers (ULDPE). VLDPE's or ULDPE's generally are considered those polymers that have a density of less than about 0.915 g/cm3. For the purposes of the present invention, such a distinction will not be made for either the heterogeneous or homogeneous polymers, but the term LLDPE will be used to cover the whole range of densities suitable for component (B). Typical the polydispersity (i.e. Mw/Mn) for these heterogeneous polymers is from 3 to 5, more typically from 3.2 to 4.5.

A further subclass of low density polyolefin is that of the uniformly branched or homogeneous linear ethylene polymers (homogeneous LLDPE). The homogeneous polymers, like heterogeneous LLDPE, contain no long chain branches, only branches derived from α-olefins having more than two carbon atoms. Homogeneous polymers include those made as described in U.S. Pat. No. 3,645,992 and those made using metallocene catalysts in a batch reactor having relatively high olefin concentrations (as described in U.S. Pat. Nos. 5,026,798 and 5,055,438). The homogeneous LLDPE employed in the present composition generally has a polydispersity from 1.8 to 3, typically from 1.8 to 2.5.

Especially preferred low density polyethylene components for use in extending the elastomeric polyolefin have densities in the range of from 0.890 to 0.915 g/cm$^3$ and advantageously from 0.890 to 0.910 g/cm$^3$.

Nucleators for use herein as component E), are compounds capable of reducing the time required for onset of crystallization of the syndiotactic vinylaromatic polymer upon cooling from the melt. Nucleators provide a greater degree of crystallinity in a molding resin and more consistent levels of crystallinity under a variety of molding conditions. Higher levels of crystallinity are desired in order to achieve increased chemical resistance. In addition crystal morphology may be desirably altered. Examples of suitable nucleators for use herein are metal salts, especially aluminum salts of organic acids or phosphonic acids. Especially preferred compounds are aluminum salts of benzoic acid and $C_{1-10}$ alkyl substituted benzoic acid derivatives. A most highly preferred nucleator is aluminum tris(p-tert-butyl) benzoate. The amount of nucleator used should be sufficient to cause nucleation and the onset of crystallization in the syndiotactic vinylaromatic polymer in a reduced time compared to compositions lacking in such nucleator. Preferred amounts are from 0.5 to 5 parts by weight.

Component F) is an optional reinforcing agent or filler. Suitable reinforcing agents include any mineral, glass, ceramic, polymeric or carbon reinforcing agent. Such material may be in the shape of fibers having a length to diameter ratio (L/D) of greater than 5. Preferred particle diameters are from 0.1 micrometers to 1 millimeter. Preferred reinforcing agents are glass fibers, glass roving or chopped glass fibers having lengths from 0.1 to 10 millimeters and L/D from 5 to 100. Two such suitable glass fibers are available from Owens Corning Fiberglas under the designation OCF-187A™ or 497™. Suitable fillers include nonpolymeric materials designed to reduce the coefficient of linear thermal expansion of the resulting material, to provide color or pigment thereto, to reduce the flame propagation properties of the composition, or to otherwise modify the composition's physical properties. Suitable fillers include mica, talc, chalk, titanium dioxide, clay, alumina, silica, glass microspheres, and various pigments. Preferred fillers are in the shape of particulates having (L/D) less than 5. The amount of reinforcing agent or filler employed is preferably from 10 to 50 parts by weight.

The reinforcing agent may include a surface coating of a sizing agent or similar coating which, among other functions, may promote adhesion between the reinforcing agent and theremaining components, especially the matrix, of the composition. Suitable sizing agents may contain amine, aminosilane, epoxy, and aminophosphine functional groups and contain up to 30 nonhydrogen atoms. Preferred are aminosilane coupling agents and $C_{1-4}$ alkoxy substituted derivatives thereof, especially 3-aminopropyltrimethoxysilane.

Polyarylene ethers, useful as component G) are a known class of polymer having been previously described in U.S. Pat. Nos. 3,306,874, 3,306,875, 3,257,357, and 3,257,358. A preferred polyarylene ether is poly(2,6-dimethyl-1,4-phenylene)ether. The polyphenylene ethers are normally prepared by an oxidative coupling reaction of the corresponding bisphenol compound. Preferred polyarylene ethers are polar group functionalized polyarylene ethers, which are a known class of compounds prepared by contacting polar group containing reactants with polyarylene ethers. The reaction is normally conducted at an elevated temperature, preferably in a melt of the polyarylene ether, under conditions to obtain homogeneous incorporation of the functionalizing reagent. Suitable temperatures are from 150° C. to 300° C.

Suitable polar groups include the acid anhydrides, acid halides, acid amides, sulfones, oxazolines, epoxies, isocyanates, and amino groups. Preferred polar group containing reactants are compounds having up to 20 carbons containing reactive unsaturation, such as ethylenic or aliphatic ring unsaturation, along with the desired polar group functionality. Particularly preferred polar group containing reactants are dicarboxylic acid anhydrides, most preferably maleic anhydride. Typically the amount of polar group functionalizing reagent employed is from 0.01 percent to 20 percent, preferably from 0.5 to 15 percent, most preferably from 1 to 10 percent by weight based on the weight of polyarylene ether. The reaction may be conducted in the presence of a free radical generator such as an organic peroxide or hydroperoxide agent if desired. Preparation of polar group functionalized polyarylene ethers have been previously described in U.S. Pat. Nos. 3,375,228, 4,771,096 and 4,654,405.

The polar group modified polyarylene ethers beneficially act as compatibilizers to improve adhesion between the reinforcing agent and the syndiotactic vinylaromatic polymer. Thus, there use is particularly desirable when a filler or reinforcing agent is additionally utilized. The amount of polyarylene ether employed in the present resin blend is beneficially from 0.1 to 50 parts by weight, preferably from 0.2 to 10 parts by weight.

In one embodiment of the invention the polar group modified polyarylene ether may be in the form of a coating applied to the outer surface of the reinforcing agent to impart added compatibility between the reinforcing agent and the polymer matrix. The polar group modified polyarylene ether so utilized may be in addition to further amounts of polyarylene ether or polar group modified polyarylene ether also incorporated in the blend. The surface coating is suitably applied to the reinforcing agent by contacting the same with a solution or emulsion of the polar group functionalized polyarylene ether. Suitable solvents for dissolving the polar group functionalized polyarylene ether to form a solution or for use in preparing an emulsion of a water-in-oil or oil-in-water type include methylene chloride, trichloromethane, trichloroethylene and trichloroethane. Preferably the concentration of polar group functionalized polyarylene ether in the solution or emulsion is from 0.1 weight percent to 20 weight percent, preferably 0.5 to 5 percent by weight. After coating of the reinforcing agent using either a solution or emulsion, the liquid vehicle is removed by, for example, evaporation, devolatilization or vacuum drying. The resulting surface coating is desirably from 0.001 to 10 weight percent of the uncoated reinforcing agent weight.

The compositions of the present invention are prepared by combining the respective components under conditions to provide uniform dispersal of the ingredients. Alternatively, where a polar group modified polyarylene ether is used, this component of the blend may be prepared in situ by reacting the polar group reactant with the polyphenylene ether and further incorporating the molten product directly into the finished blend. Mechanical mixing devices such as extruders, ribbon blenders, solution blending or any other suitable device or technique may be utilized.

Additional additives such as blowing agents, extrusion aids, antioxidants, plasticizers, stabilizers, ignition resistant additives, and lubricants, may also be included in the composition in amounts up to 10 percent, preferably up to 5 percent, by weight, based on final composition weight.

Having described the invention the following example is provided as further illustrative and is not to be construed as limiting. Unless stated to the contrary parts and percentages are based on weight.

EXAMPLES 1–6

Blends of components identified in Table I were prepared by first dry mixing the respective components (excepting glass fibers) in a drum mixer. All blends additionally contained 1.0 percent tetrakis(methylene(3,5-di-tertbutyl-4-hydroxyhydrocinnamate))methane antioxidant (Irganox 1010 and 0.4 percent carbon black pigment concentrate (25 percent carbon black in syndiotactic polystyrene matrix). The resulting mixture was passed through a 30 mm W-P compounding extruder at a controlled rate. The resulting compounded blend was injection molded under standard conditions and tested according to ASTM test methods. Results are contained in Table 1.

Identification of Components (A) Syndiotactic polystyrene (SPS): Mw=300,000, Tg 95° C. and Tm 270° C. (available from The Dow Chemical Company as XU 72104.04).

(B) Oil Extended Elastomeric Polyolefin (EP): Engage™ DEG 8180 brand polyolefin elastomer available from The Dow Chemical Company incorporating 25 weight percent Drakeol™ 34, aliphatic mineral oil (available from Penreco, division of Pennzoil Products Company).

(B') Engage™ DEG 8180 brand polyolefin elastomer, density 0.863, Melt Index 0.5.

(C) Compatibilizer: Septon™ 1050, hydrogenated styrene/isoprene diblock copolymer, styrene content 50 percent, melt flow 0.2 dg/min (Condition G), available from Kuraray Co., Ltd.

(C') Compatibilizer: Septon™ 2104, hydrogenated styrene/isoprene/styrene triblock copolymer, styrene content 65 percent, melt flow 25 dg/min (Condition G), available from Kuraray Co., Ltd.

(D) Domain Forming Rubbery polymer: Kraton G 1651™, hydrogenated styrene/butadiene/styrene block copolymer, Mw=270,000, Mw/Mn=1.06., styrene content 32 percent, melt flow (Condition X ASTM D-1238), 0 g/10 min. Tg=−48° C., available from Shell Chemical.

(D') Linear Low density polyethylene, XU59090.01, density 0.908 g/cc, Melt Index (I2) 0.5 dg/min, available from The Dow Chemical Company.

(E) Nucleator aluminum tris(p-tert-butyl)benzoate (pTBBA)

TABLE 1

Physical Properties of Syndiotactic Polystyrene modified with Indicated Percentages of Additives

| Ex | B % | B' % | C % | C' % | D % | D' % | E % | Izod Impact[2] ft lb/in (J/M) | Dart Impact[3] in lb (J) | Ey[4] % | Ty[5] klb/in$^2$ (MPa) | Er[6] % | Tr[7] klb/in$^2$ (MPa) | Modulus Mlb/in$^2$ (MPa) |
|---|---|---|---|---|---|---|---|---|---|---|---|---|---|---|
| 1 | 15 | 0 | 0 | 0 | 5 | 0 | .65 | 0.71 (350) | 64 (7.3) | 1.5 | 4.22 (29) | 32.0 | 3.85 (27) | 0.33 (2200) |
| 2 | 10 | 0 | 0 | 0 | 10 | 0 | " | 1.01 (500) | 74 (8.4) | 2.6 | 3.75 (26) | 38.6 | 3.85 (27) | 0.28 (2000) |
| 3 | 13.5 | 0 | 0 | 0 | 2 | 4.5 | " | 0.47 (230) | 44 (5.0) | 1.6 | 4.76 (33) | 20.9 | 4.12 (28) | 0.32 (2200) |
| 4 | 9 | 0 | 0 | 0 | 2 | 9 | " | 0.43 (210) | 23 (2.6) | 1.8 | 5.09 (35) | 25.4 | 4.37 (30) | 0.33 (2200) |
| 5 | 15 | 0 | 1 | 0 | 4 | 0 | " | 0.83 (410) | 83 (9.4) | 1.5 | 4.40 (30) | 39.5 | 3.95 (28) | 0.34 (2300) |
| 6 | 15 | 0 | 0 | 1 | 4 | " | " | 0.96 (480) | 91 (10.3) | 1.4 | 4.22 (29) | 44.6 | 3.94 (28) | 0.35 (2300) |
| A[1a] | 0 | 0 | 0 | 0 | 20 | " | " | 1.46 (730) | 190 (22) | 2.2 | 5.13 (35) | 18.6 | 4.51 (31) | 0.29 (2000) |
| B[1b] | 0 | 15 | 0 | 0 | 5 | " | " | 0.37 (190) | 26 (2.9) | 2.2 | 4.82 (33) | 2.2 | 4.82 (33) | 0.31 (2100) |
| C[1b] | 0 | 20 | 0 | 0 | 5 | " | " | 0.33 (170) | 28 (3.2) | 2.2 | 4.27 (29) | 2.2 | 4.24 (29) | 0.28 (1900) |

[1a]Comparative, no elastomeric polyolefin or compatibilizer
[1b]Comparative, no extender oil in elastomeric polyolefin
[2]ASTM D256, method A
[3]ASTM D3764
[4]Tensile Elongation at yield ASTM D638-87b
[5]Tensile Strain at yield ASTM D638-87b
[6]Tensile Elongation at rupture ASTM D638-87b
[7]Tensile Strain at rupture ASTM D638-87b By reference to Table 1 it may be seen that the addition of oil extended elastomeric polyolefins to syndiotactic polystyrene resin blends results in increased elongation values for the formulations. By incorporating a mixture of oil extended elastomeric polyolefin and a high molecular weight, hydrogenated, triblock copolymer, the benefits of high tensile strength and impact resistance can be retained in the resulting blend while improving the elongation properties thereof.

EXAMPLES 7–9

Glass Reinforced Blends

Polymer blends similar to those of examples 1–6 but containing differing contents of chopped fiberglass reinforcing aid and fumaric acid modified polyphenylene ether compatibilizer (FAPPO) were prepared and tested. The FAPPO was prepared by melt blending in an extruder polyphenylene ether, fumaric acid (3.0 percent) and 2,3-dimethyl-2,3-diphenylbutane initiator (Nofmer™ BC, available from Nippon Oil and Fat, Inc.) (2.0 percent). The blends were prepared by compounding syndiotactic polystyrene (XU-72104.02, 300,000 Mw, available from The Dow Chemical Company), with the oil extended elastomeric polyolefin, the domain forming rubbery polymer, antioxidant and carbon black concentrate in a 30 mm W-P compounding extruder. This blend was then fed at a controlled rate to a second extruder while feeding fiberglass, FAPPO, pTBBA, additional amounts of antioxidant and additional SPS (XU-72104.03, 230,000 Mw, available from The Dow Chemical Company). In the resulting blend the ratio of SPS resins (300,000/230,000) was 30/70. The resulting compounded blend was injection molded under standard conditions and tested according to ASTM test methods. Results are contained in Table 2.

Identification of Components (A) Syndiotactic polystyrene (SPS)

(B) Oil Extended Elastomeric Polyolefin (EP): Engage™ DEG 8180 brand polyolefin elastomer available from The Dow Chemical Company incorporating 25 weight percent Drakeol™ 34, aliphatic mineral oil (available from Penreco, division of Pennzoil Products Company).

(B') Engage™ DEG 8180 brand polyolefin elastomer, density 0.863, Melt Index 0.5.

(D) Domain Forming Rubbery Polymer: Kraton™ G 1651, hydrogenated styrene/butadiene/styrene block copolymer, Mw=270,000, Mw/Mn=1.06., styrene content 32 percent, melt flow (Condition X ASTM D-1238), 0 g/10 min. Tg=−48° C., available from Shell Chemical.

(E) Nucleator aluminum tris(p-tert-butyl)benzoate (pTBBA)

(F) chopped glass fibers, 0.25 in (6 mm), surface coated with aminopropylsilane sizing agent, OCF 187A-AA, available from Owens Corning Fiberglass, Inc.

(G) FAPPO

TABLE 2

Physical Properties of Glass Filled Syndiotactic Polystyrene Modified with Indicated Percentages of Additives

| Ex | B % | B' % | D % | E % | F % | G % | Izod Impact[2] ft lb/in (J/M) | Ty[3] klb/in$^2$ (MPa) | Er[4] % | Modulus Mlb/in$^2$ (MPa) | DTUL[5] ° F. (° C.) |
|---|---|---|---|---|---|---|---|---|---|---|---|
| 7 | 15 | 0 | 5 | 0.6 | 20 | 2.0 | 1.2 (610) | 7.7 (53) | 2.5 | 0.69 (4600) | 307 (153) |
| 8 | " | " | " | " | 30 | " | 1.5 (750) | 9.9 (68) | 2.2 | 1.0 (6700) | 365 (185) |
| 9 | " | " | " | " | 40 | " | 1.7 (870) | 9.8 (67) | 1.7 | 1.3 (8700) | 335 (168) |
| D[1] | 0 | 15 | " | " | 20 | " | | 8.4 (58) | 1.8 | 0.68 (4500) | 276 (136) |

TABLE 2-continued

Physical Properties of Glass Filled Syndiotactic Polystyrene Modified with Indicated Percentages of Additives

| Ex | B % | B' % | D % | E % | F % | G % | Izod Impact[2] ft lb/in (J/M) | Ty[3] klb/in² (MPa) | Er[4] % | Modulus M1b/in² (MPa) | DTUL[5] °F. (°C.) |
|---|---|---|---|---|---|---|---|---|---|---|---|
| E[1] | " | " | " | " | 30 | " | 1.5 (770) | 10.3 (71) | 2.0 | 0.87 (5800) | 334 (168) |
| F[1] | " | " | " | " | 40 | " | 1.6 (800) | 10.6 (73) | 1.8 | 1.0 (6700) | 345 (174) |

[1]Comparative, no extender oil in elastomeric polyolefin
[2]ASTM D256, method A
[3]Tensile Strain at yield ASTM D638-87b
[4]Tensile Elongation at rupture ASTM D638-87b
[5]Distortion Temperature under Load ASTM D256

By reference to Table 2 it may be seen that the addition of oil extended elastomeric polyolefins to syndiotactic polystyrene resin blends results in improvement of the heat distortion temperature (DTUL) of all but the highest glass filled formulations without sacrifice of remaining physical properties of the resin blend.

What is claimed is:

1. A composition of matter comprising:
   A) from 25 to 90 parts by weight of a syndiotactic, vinyl aromatic polymer,
   B) from 5 to 30 parts by weight of an oil extended, elastomeric polyolefin selected from the group consisting of ethylene interpolymers, said polyolefin having a density from 0.85 to 0.93 g/cm³, a melt index from 0.1 to 5 g/10 min. and a polydispersity of 1.8 to 5;
   C) from 1 to 10 parts by weight of a compatibilizer comprising a styrene containing block copolymer or a hydrogenated derivative thereof;
   D) from 5 to 25 parts by weight of a domain forming rubbery polymer comprising a triblock copolymer of styrene and a conjugated diene or a hydrogenated derivative thereof with the proviso that component (C) is distinguished from component (D);
   E) from 0 to 5 parts by weight of a nucleator for the syndiotactic, vinylaromatic thermoplastic resin,
   F) from 0 to 60 parts by weight of a reinforcing agent, and
   G) from 0 to 90 parts by weight of a polyarylene ether or polar group modified polyarylene ether.

2. A composition according to claim 1, wherein the domain forming rubbery polymer is a hydrogenated styrene/butadiene/styrene triblock copolymer having an apparent weight average molecular weight from 100,000 to 400,000 Daltons (based on a polystyrene standard derived from gel permeation chromatography data and uncorrected for hydrodynamic volume difference) and a melt flow rate (Condition X) of 0 to 0.5 g/min.

3. A composition according to claim 1, wherein the reinforcing agent comprises glass fibers.

4. A composition according to claim 3, wherein the elastomeric ethylene interpolymer has a density of from 0.860 to 0.920 g/cm³, a melt index from 0.2 to 3 g/10 min., and a polydispersity of 1.8 to 4.

5. A composition according to claim 4, wherein the elastomeric polyolefin is a substantially linear ethylene polymer or interpolymer wherein the polymer backbone is substituted with an average of 0.01 to 3 long chain branches/1000 carbons.

6. A composition according to claim 1 wherein component D) additionally comprises a low density polyethylene resin.

7. A composition according to claim 1 wherein component D) is a hydrogenated styrene/butadiene/styrene block copolymer.

8. A composition according to claim 1 wherein component B) is selected from the group consisting of ethylene/propylene copolymers, ethylene/1-butene copolymers, ethylene/1-hexene copolymers, ethylene/1-octene copolymers, terpolymers of ethylene/propylene and a comonomer, and grafted derivatives thereof.

9. A composition according to claim 8 wherein component D) is present in an amount from 5 to 25 parts by weight.

* * * * *